(12) United States Patent
Alrashed

(10) Patent No.: US 11,573,825 B2
(45) Date of Patent: *Feb. 7, 2023

(54) SYSTEM FOR REAL-TIME SCHEDULING IN AN ASYNCHRONOUS TRANSFER MODE COMMUNICATION NETWORK

(71) Applicant: Imam Abdulrahman Bin Faisal University, Dammam (SA)

(72) Inventor: Saleh Alrashed, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 136 days.

This patent is subject to a terminal disclaimer.

(21) Appl. No.: 17/205,065

(22) Filed: Mar. 18, 2021

(65) Prior Publication Data
US 2021/0200585 A1    Jul. 1, 2021

Related U.S. Application Data

(63) Continuation of application No. 15/923,171, filed on Mar. 16, 2018, now Pat. No. 11,042,404.

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC .................................................. G06F 9/4881
See application file for complete search history.

(56) References Cited

U.S. PATENT DOCUMENTS

| 7,086,057 B2 | 8/2006 | Hayashi |
| 2002/0138542 A1 | 9/2002 | Bollella |

(Continued)

FOREIGN PATENT DOCUMENTS

| JP | 2007219937 A | 8/2007 |
| KR | 157378181 | 12/2015 |

OTHER PUBLICATIONS

Diaz-Ramirez et al., Comprehensive Comparison of Schedulabitlity Tests for uniprocessor Rate-Monotonic Scheduling, Journal of Applied Research and Technology, vol. 11, Jun. 2013, pp. 408-436.*

(Continued)

*Primary Examiner* — Diem K Cao
(74) *Attorney, Agent, or Firm* — Oblon, McClelland, Maier & Neustadt, L.L.P.

(57) ABSTRACT

A real-time feasibility device includes circuitry configured to sort tasks into a first scheduling priority order; split the sorted tasks into a first subset which can be scheduled using an inexact condition test and a second subset which cannot be scheduled using the inexact condition test; test the first subset using the inexact condition test; sort the tested first subset into a second scheduling priority order; sort the second subset into a third scheduling priority order; filter out one or more tasks of the second subset which cannot be scheduled using the inexact condition test or the exact condition test; test remaining tasks of the second subset using the exact condition test; sort the tested remaining tasks of the second subset into a fourth scheduling priority order; and execute the sorted and tested first subset and the sorted and tested remaining tasks of the second subset.

5 Claims, 5 Drawing Sheets

(56) References Cited

U.S. PATENT DOCUMENTS

2008/0040171 A1     2/2008   Albers
2012/0284728 A1    11/2012   Tchidjo Moya et al.
2013/0290970 A1    10/2013   Shah

OTHER PUBLICATIONS

Nasro Min-Allah, et al.; A hybrid test for faster feasibility analysis of periodic tasks; Oct. 2011; pp. 1,2, 3, and 8; https://citeseerx.ist.psu.edu/viewdoc/download?doi=10.1.1.402.3621&rep=rep1&type=pdf.

John Kubiatowicz, et al.; EECS 262a; Advanced Topics in Computer Systems; Lecture 13; Oct. 10, 2012; p. 1, slide 3; p. 3, siide 9; and p. 4 slide 13; https://people.eecs.berkeley.edu/~kubitron/courses/cs262a-F12/lectures/lec13-DRF.pptx.

Tarek A. AlEnawy, et al., Energy-Aware Task Allocation for Rate Monotonic Scheduling, Jun. 2013, p. 1 Abstract, p. 4 and p. 5, https://ieeexplore.ieee.org/document/1388388.

Mikael Sjodin, et al., Improved Response-Time Analysis Calculations, Aug. 1999; 11 pages.

Min-Allah et al., A Hybrid Test for Faster Feasibility Analysis of Periodic Tasks, ICIC International, Oct. 2011, 10 pages.

Jane W.S. Liu et al., Algorithms for Scheduling Imprecise Computations, IEEE, 1991, pp. 58-68.

\* cited by examiner

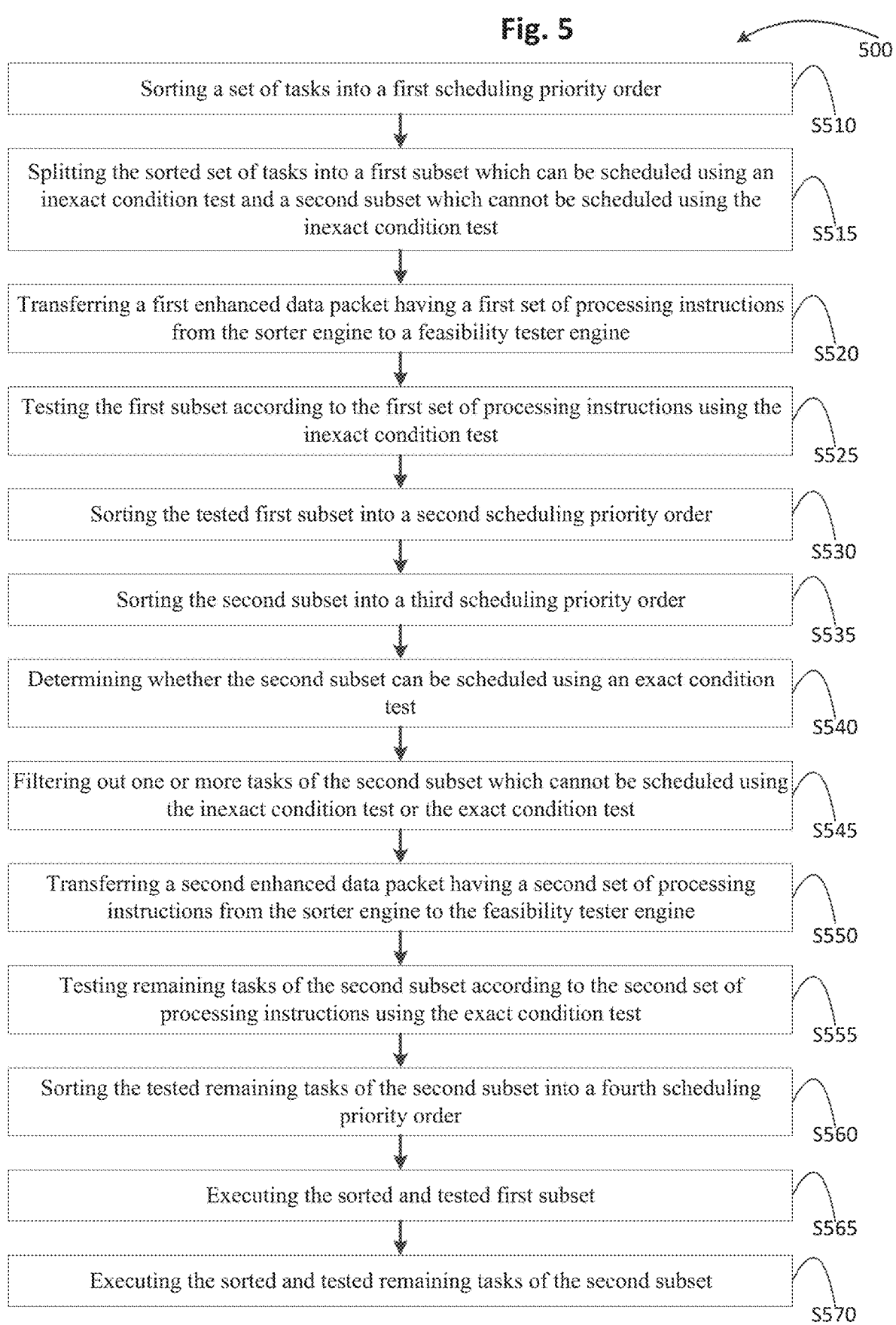

SYSTEM FOR REAL-TIME SCHEDULING IN AN ASYNCHRONOUS TRANSFER MODE COMMUNICATION NETWORK

CROSS-REFERENCE TO RELATED APPLICATIONS

The present application is a Continuation of Ser. No. 15/923,171, allowed, having a filing date of Mar. 16, 2018.

BACKGROUND

Field of the Disclosure

A method and system for enhanced feasibility testing of pre-emptive real-time systems are described herein. In particular, separation and prioritization of tasks are applied to enhance feasibility testing of pre-emptive real-time systems and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Rate Monotonic (RM) scheduling is a priority assignment algorithm used in real-time operating systems (RTOSs) with a static-priority scheduling class. The static priorities are assigned according to one cycle duration of a job. As a result, a shorter cycle duration results in a higher job priority. The task with the shortest periodicity executes with the highest priority. The RTOSs are generally pre-emptive and have deterministic guarantees with regard to response times. An RTOS serves real-time applications that process data as it comes in. It is a time-bound system with well-defined fixed-time constraints. The constraints can be event driven or time sharing. Event-driven systems switch between tasks based on their priorities, while time-sharing systems switch the task based on clock interrupts. RM analysis is used in conjunction with those systems to provide scheduling guarantees for a particular application.

An RM scheduling method includes steps of checking the number of tasks to be scheduled, allocating priorities to the tasks, and processing the tasks in a shortest-period-first manner. Determining an RM system feasibility includes dividing feasibility tests into two categories of inexact conditions and exact conditions. Combining both conditions has the potential to determine the RM schedulability on a single processor faster and without compromising system utilization.

Inexact testing is usually limited to low system utilization, while exact testing is complex and cannot be utilized for many online systems. Accordingly, it is one objective of the present disclosure to provide a schedulability system and method that optimize both exact and inexact condition testing for rate-monotonic scheduling.

SUMMARY

An exemplary embodiment includes a method of determining real-time system feasibility. The method includes sorting, via a sorter engine of a pre-emptive real-time processor, a set of tasks into a first scheduling priority order; splitting, via a splitter engine of the pre-emptive real-time processor, the sorted set of tasks into a first subset which can be scheduled using an inexact condition test and a second subset which cannot be scheduled using the inexact condition test; transferring a first enhanced data packet having a first set of processing instructions from the sorter engine to a feasibility tester engine; testing, via the feasibility tester engine, the first subset according to the first set of processing instructions using the inexact condition test; sorting, via the sorter engine of the pre-emptive real-time processor, the tested first subset into a second scheduling priority order; sorting, via the sorter engine of the pre-emptive real-time processor, the second subset into a third scheduling priority order; determining, via circuitry of the pre-emptive real-time processor, whether the second subset can be scheduled using an exact condition test; filtering out one or more tasks of the second subset which cannot be scheduled using the inexact condition test or the exact condition test; transferring a second enhanced data packet having a second set of processing instructions from the sorter engine to the feasibility tester engine; testing, via the feasibility tester engine of the pre-emptive real-time processor, remaining tasks of the second subset according to the second set of processing instructions using the exact condition test; sorting, via the sorter engine of the pre-emptive real-time processor, the tested remaining tasks of the second subset into a fourth scheduling priority order; executing, via an execution engine of the pre-emptive real-time processor, the sorted and tested first subset; and executing, via the execution engine of the pre-emptive real-time processor, the sorted and tested remaining tasks of the second subset.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a flowchart for an exemplary method of determining real-time system feasibility according to one embodiment.

DETAILED DESCRIPTION

Figure 1:
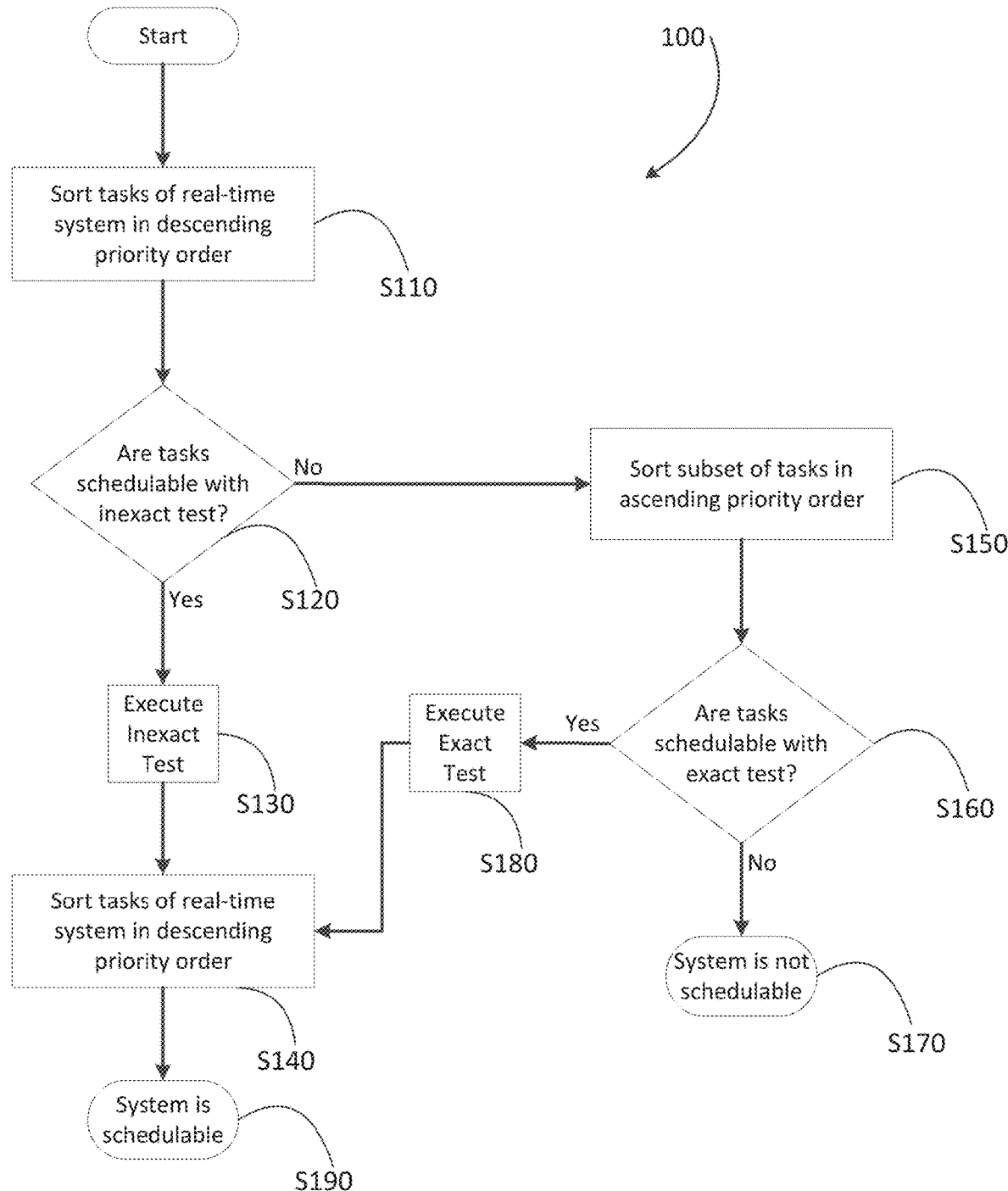
FIG. 1 is a flowchart of an exemplary feasibility testing process for a real-time system according to one embodiment.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions may need to be made in order to achieve the developer's specific goals, such as compliance with application- and business-related constraints, and that these specific goals will vary from one implementation to another and from one developer to another.

An objective of embodiments described herein is to schedule real-time systems such that the associated timing constraints of a task deadline remain intact and the overall system feasibility is determined in an efficient way, especially online systems. An increased feasibility for scheduling real-time tasks splits a work load into two parts and the scheduling feasibility of each part is determined accordingly. A first feasibility subset is checked through a sufficient condition by starting with a highest priority task, while a second feasibility subset is tested through necessary and sufficient conditions with a lowest priority first approach.

A combination of the two techniques results in a faster feasibility test for a real-time system. A lowest priority first approach is integrated with the second feasibility subset, which determines system infeasibility faster. Embodiments described herein include, but are not limited to operating system schedulers, cloud-based gaming, robotics, avionics, and vehicles.

Schedulability analysis is used to determine off-line whether hard real-time jobs in a real-time system will meet their deadlines. One method to perform schedulability analysis of fixed priority scheduled systems is to calculate the worst case response-time of each process, i.e. to perform an RTA. The system is deemed schedulable if the calculated response-time for each process is less than its corresponding deadline. RTA can be used for hard disk drives and communications networks, such as Asynchronous Transfer Mode (ATM) communication networks (see Sjodin et al. "Improved Response-Time Analysis Calculations," incorporated in its entirety by reference herein).

A consideration in designing complex real-time multitasking systems is timing accuracy. The system needs to provide predictable behavior under a gamut of circumstances. When scheduling a task set, an appropriate scheduling algorithm is applied to ensure the timing constraints of the task set. One exemplary algorithm for scheduling real-time systems is Rate Monotonic (RM) scheduling. The RM algorithm assigns priorities to tasks based on activation rates.

It can be determined whether a real-time system is RM-schedulable by determining if a task passes a feasibility test. The feasibility test is divided into two classes for an inexact condition and an exact condition.

An inexact condition is an imprecise condition. If a task passes a sufficient test (as determined by the specific application), then the task is deemed to be schedulable. Otherwise, the task fails the sufficient test and is not deemed to be schedulable.

An exact condition needs both necessary and sufficient conditions. In an exact condition, the task set is RM schedulable; otherwise, the system is not RM schedulable.

One exemplary inexact test to determine whether periodic tasks are RM schedulable is a Liu & Layland bound (LL-bound) test. Liu & Layland determined that for a set of n periodic tasks with unique periods, a feasible schedule that will always meet deadlines exists if the CPU utilization is below a specific bound, which depends on the number of tasks. The complexity of an inexact condition is polynomial, but it can only provide up to 69% system utilization. LL-bound works well with low system utilization.

Liu & Layland showed that for a set of n periodic tasks with unique periods, a feasible schedule that will meet deadlines exists if the CPU utilization is below a specific bound, depending on the number of tasks. The schedulability test for RM scheduling is $$U = \sum_{i=1}^{n}(Ci/Ti) \le n\left(2^{\frac{1}{n}} - 1\right)$$

where $C_i$ is the computation time, T is the release period (with deadline one period later), and n is the number of processes to be scheduled. When the number of processes tends towards infinity, the expression will tend towards ln 2=0.693147. Therefore, a rough estimate is an RM schedule can meet all of the deadlines if the CPU utilization is less than 69.32%. The other 30.7% of the CPU utilization can be dedicated to lower-priority non real-time tasks.

Response Time Analysis (RTA) can be used as an exact test for a periodic task set. An exact condition results in 100% system utilization, but the complexity is pseudo-polynomial and it may not be applicable for online systems. RTA is a schedulability analysis of fixed priority scheduled systems which calculates the worst case response time of each process. The system is deemed schedulable if the calculated response time for each process is less than its corresponding deadline. The calculated response time $R_i$ can be calculated as $$Ri = Bi + Ci + \sum_{j \in hp(i)} \left\lceil \frac{(Ri + Jj)}{Tj} \right\rceil Cj$$

where $B_i$ is the maximum blocking from lower priority processes. $J_i$ is the maximum jitter (i.e. variance from periodicity). $C_i$ is the worst case computation time, $T_i$ is the period (minimum inter-arrival time), and hp(i) denotes the set of processes with a higher priority than process i.

Embodiments described herein combine LL-bound and RTA for a faster feasibility analysis. In addition, a reverse order of tasks is used while checking the feasibility, which starts from the lowest priority. This method is faster than checking the feasibility of tasks starting from the highest priority task. The combination of LL-bound and RTA and starting from the lowest priority task is also more practical for online systems.

The complexity of existing techniques is lowered by combining inexact conditions with exact conditions for a faster feasibility analysis. The combined testing provides 100% CPU utilization by splitting the task set into two subsets. The feasibility of the first subset is determined with the inexact condition (LL-bound), while the feasibility of the remaining task set is subject to the exact condition. For the second subset, the schedulability of the task set is arranged in ascending priority order starting from the lowest priority task in the system using RTA. This technique results in a faster analysis of the RM scheduling problem for pre-emptive systems.

FIG. 1 is a flowchart of an exemplary feasibility testing process 100 for a real-time system using embodiments described herein. In step S110, tasks of the real-time system are sorted in a descending priority order based on activation rates of the tasks. In one embodiment, RM scheduling can be used. In step S120, it is determined whether the tasks will be scheduled using an inexact condition test, such as an LL-bound test.

If the tasks will be scheduled using an inexact condition test (a "YES" decision in step S120), the process proceeds to step S130. In step S130, an inexact testis executed on the tasks schedulable with an inexact test. In step S140, the tasks of the real-time system are sorted in a descending priority order based on activation rates of the tasks.

If the tasks will not be scheduled using an inexact condition test (a "NO" decision in step S120), the process proceeds to step S150, where the remaining subset of tasks is sorted in an ascending priority order based on activation rates of the tasks.

In step S160, it is determined whether the sorted tasks received from step S150 will be scheduled using an exact condition test, such as an RTA test. If the sorted tasks will not be scheduled using an exact condition test (a "NO" decision in step S160), the results are filtered out in step S170 because the system is not schedulable.

If the sorted tasks received from step S150 will be scheduled using an exact condition test (a "YES" decision in step S160), the process proceeds to step S180, where an exact test is executed on the tasks schedulable with an exact test. The process proceeds to step S140 where the tasks from the executed exact test are sorted in a descending priority order based on activation rates of the tasks. Tasks for the real-time system from step S140 are schedulable, as represented by step S190.

Figure 2:
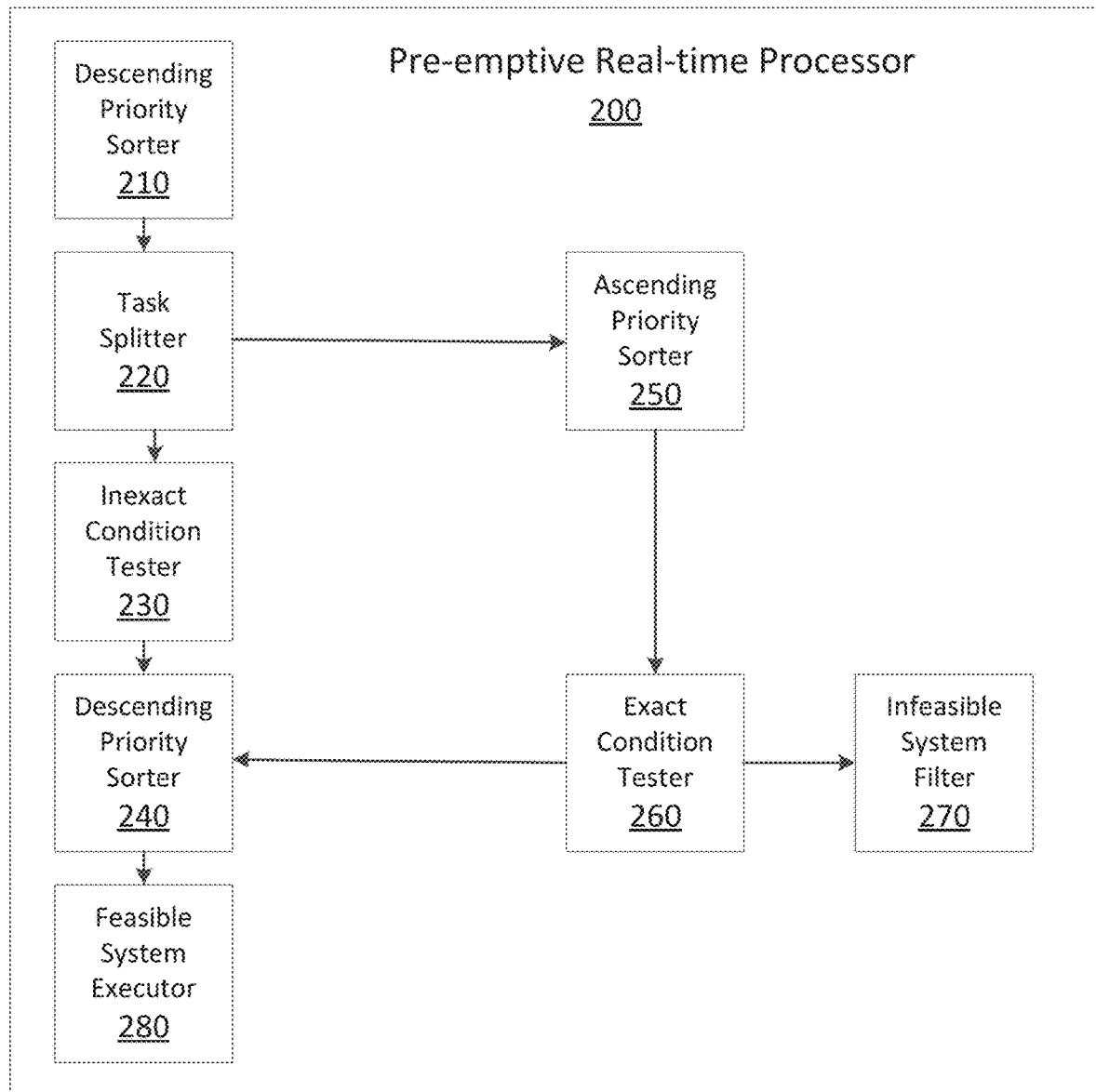
FIG. 2 is a block diagram illustrating an exemplary pre-emptive real-time processor according to one embodiment.

FIG. 2 is a block diagram illustrating an exemplary pre-emptive real-time processor 200 having circuitry configured to execute embodiments as described herein. A descending priority sorter 210 has circuitry configured to sort tasks of a real-time system in descending priority order based on activation rates of the tasks, as described by step S110. The descending priority sorter 210 transmits results to a task splitter 220.

The task splitter 220 has circuitry configured to determine which tasks can be scheduled using an inexact condition test, as described by step S120. The task splitter 220 transmits those results which can be scheduled using an inexact condition test to an inexact condition tester 230. The inexact condition tester 230 tests the received results using an LL-bound test, for example. The inexact condition tester 230 forwards the tested results to a descending priority sorter 240, as described by step S130.

When the task splitter 220 has determined that some of the tasks cannot be scheduled with an inexact condition test, those tasks are forwarded to an ascending priority sorter 250. The ascending priority sorter 250 has circuitry configured to sort tasks received from the task splitter 220 in ascending order based on activation rates of the tasks, as described by step S140. The prioritized results are transmitted to an exact condition tester 260. The exact condition tester 260 tests the received results using an RTA test, for example.

If tasks cannot be scheduled with an inexact condition test or an exact condition test, those tasks are forwarded to an infeasible system filter 270. Tasks that can be scheduled with an inexact condition test or an exact condition test are forwarded to the descending priority sorter 240 for prioritization in descending priority order based on activation rates of the tasks. The prioritized results are transmitted to a feasible system executor 280 for execution in a feasible system.

Figure 3:
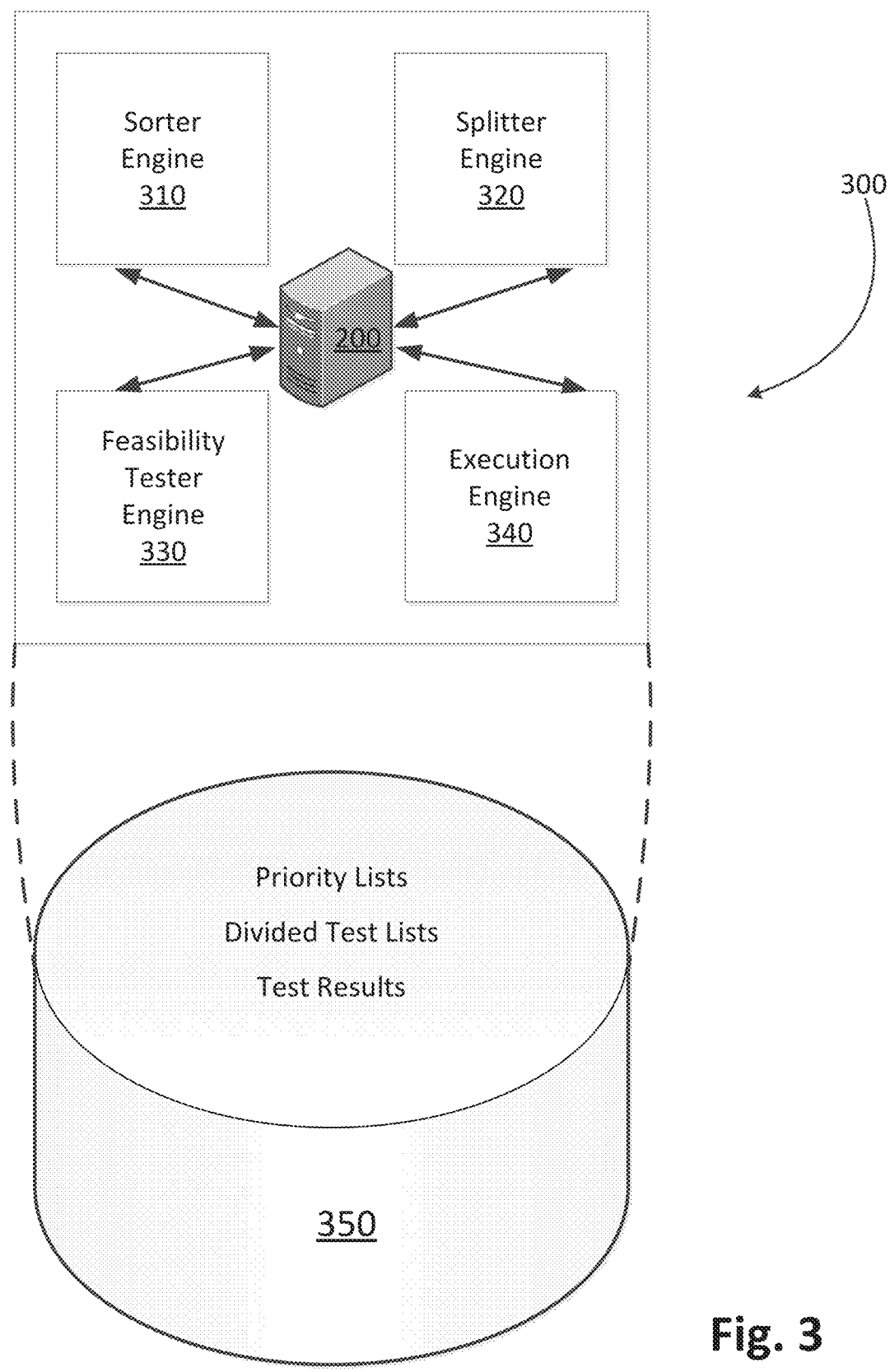
FIG. 3 is a block diagram illustrating an exemplary pre-emptive real-time system according to one embodiment.

FIG. 3 is a block diagram illustrating an exemplary pre-emptive real-time system 300. The pre-emptive real-time processor 200 has a plurality of processing engines. References to the engines throughout the disclosure are meant to refer to software processes executed by circuitry of one or more processing circuits, which can also be referred to interchangeably as processing circuitry.

A sorter engine 310 has circuitry configured to sort data transmitted from the pre-emptive real-time processor 200. Data can be sorted in a descending priority schedule or an ascending priority schedule based on activation rates of the tasks. Sorted results are transmitted back to the pre-emptive real-time processor 200.

A splitter engine 320 has circuitry configured to determine which tasks are schedulable using an inexact condition test and which tasks are schedulable using an exact condition test. The divided results are transmitted to the pre-emptive real-time processor 200 as data scheduled for inexact condition testing and data scheduled for exact condition testing.

A feasibility tester engine 330 has circuitry configured to test results received from the splitter engine 320, via the pre-emptive real-time processor 20. Results tagged for inexact condition testing are tested using an LL-bound test, for example. Results tagged for exact condition testing are tested using an RTA test, for example.

The inexact condition tested results and the exact condition tested results received from the feasibility tester engine 330 are forwarded to an execution engine 340, via the pre-emptive real-time processor 200 for execution in a feasible system. Tasks that were not deemed schedulable for inexact condition testing or exact condition testing are filtered and removed from the system.

Each of the sorter engine 310, the splitter engine 320, the tester engine 330, and the execution engine 340 transmit data to and from a real-time database 350. Data stored in the real-time database 350 include, but are not limited to priority lists from the sorter engine 310, divided test lists from the splitter engine 320, and test results from the feasibility tester engine 330.

In response to selecting one of the engines such as the feasibility tester engine 330, the sorter engine 310 transmits an enhanced data packet to the feasibility tester engine 330 via the pre-emptive real-time processor 200 to perform the requested computing processes. For example, the enhanced data packet can include processing instructions for cross-referencing sorted prioritized results from the sorter engine 310 with an inexact condition test of the feasibility tester engine 330. Another enhanced data packet can include processing instructions for cross-referencing sorted prioritized results from the sorter engine 310 with an exact condition test of the feasibility tester engine 330.

By condensing the data associated with the request into a single data structure that is transmitted as an enhanced data packet, vast amounts of data are condensed, which reduces computer congestion. In addition, other processing tasks associated with other processing engines can be similarly distributed for an enhanced and efficient pre-emptive real-time system 300.

Figure 4:
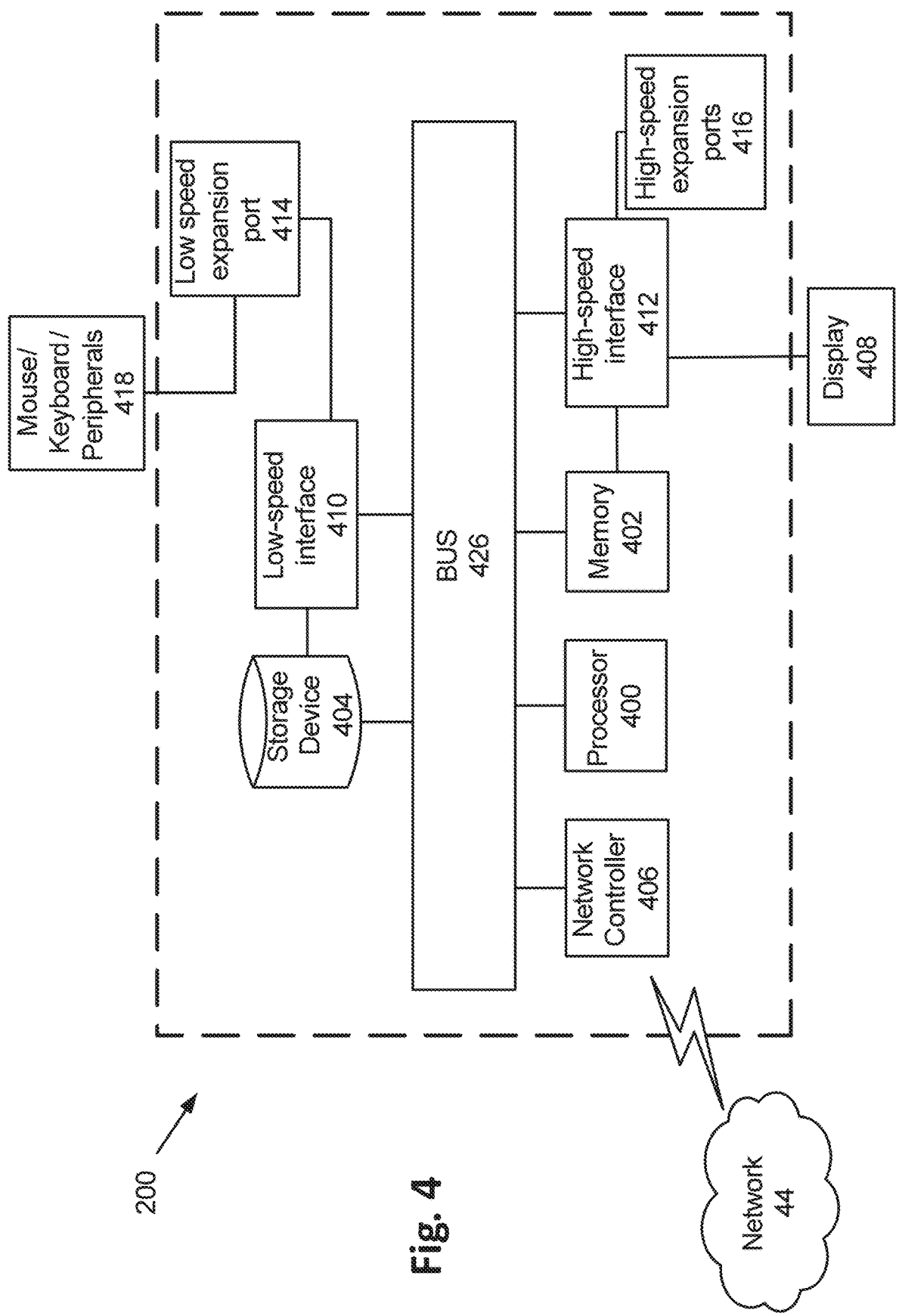
FIG. 4 is a schematic of an exemplary computing device according to one embodiment.

FIG. 4 is a schematic of an exemplary computing device, such as pre-emptive real-time processor 200, which can be used to implement the techniques described in this disclosure. The computing device 200 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 200 includes a processor 400, a memory 402, a storage device 404, a high-speed interface 412 connecting to the memory 402 and multiple high-speed expansion ports 416, and a low-speed interface 410 connecting to a low-speed expansion port 414 and the storage device 404. Each of the processor 400, the memory 402, the storage device 404, the high-speed interface 412, the high-speed expansion ports 416, and the low-speed interface 410 are interconnected using various busses, such as communication bus 426, and may be mounted on a common motherboard or in other manners as appropriate.

The processor 400 can process instructions for execution within the computing device 200, including instructions stored in the memory 402 or on the storage device 404 to display graphical information for a GUI on an external input/output device, such as a display 408 coupled to the high-speed interface 412. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 402 stores information within the computing device 200. In some implementations, the memory 402 is a volatile memory unit or units. In some implementations, the memory 402 is a non-volatile memory unit or units. The memory 402 can also be another form of computer-readable medium, such as a magnetic or optical disk.

The storage device 404 is capable of providing mass storage for the computing device 200. In some implementations, the storage device 404 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 400), perform one or more methods, such as those described above. The instructions can also be stored by one or more storage devices, such as computer- or machine-readable mediums (for example, the memory 402, the storage device 404, or memory on the processor 400).

The high-speed interface 412 manages bandwidth-intensive operations for the computing device 200, while the low-speed interface 410 manages lower bandwidth-intensive operations. Such allocation of functions is an example only. In some implementations, the high-speed interface 412 is coupled to the memory 402, the display 408 (e.g., through a graphics processor or accelerator), and to the high-speed expansion ports 416, which may accept various expansion cards (not shown). In the implementation, the low-speed interface 410 is coupled to the storage device 404 and the low-speed expansion port 414. The low-speed expansion port 414, which can include various communication ports (e.g., USB, Bluetooth, Ethernet, wireless Ethernet) can be coupled to one or more input/output devices 418, such as a keyboard, a pointing device, a scanner, or a networking device such as a switch or router, e.g., through a network adapter.

The computing device 200 also includes a network controller 406, such as an Intel Ethernet PRO network interface card from Intel Corporation of America, for interfacing with a network 44. As can be appreciated, the network 44 can be a public network, such as the Internet, or a private network such as an LAN or WAN network, or any combination thereof and can also include PSTN or ISDN sub-networks. The network 44 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 4 is described as having a storage medium device 404, the claimed advancements are not limited by the form of the computer-readable media on which the instructions of the described processes are stored. For example, the instructions can be stored on CDs. DVDs, in FLASH memory, RAM. ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 408 (e.g., a CRT (cathode ray tube) or LCD (liquid crystal display) monitor) for displaying information to the user and a keyboard and a pointing device 418 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 5 is a flowchart for an exemplary method 500 of determining real-time system feasibility. In step S510, a set of tasks is sorted into a first scheduling priority order. The sorting can be executed via a sorter engine of a pre-emptive real-time processor.

In step S515, the sorted set of tasks is split into a first subset which can be scheduled using an inexact condition test and a second subset which cannot be scheduled using the inexact condition test. The splitting can be executed via a splitter engine of the pre-emptive real-time processor.

In step S520, a first enhanced data packet having a first set of processing instructions is transferred from the sorter engine to a feasibility tester engine of the pre-emptive real-time processor.

In step S525, the first subset is tested according to the first set of processing instructions using the inexact condition test. The testing can be executed via the feasibility tester engine of the pre-emptive real-time processor.

In step S530, the tested first subset is sorted into a second scheduling priority order. The sorting can be executed via the sorter engine of the pre-emptive real-time processor.

In step S535, the second subset is sorted into a third scheduling priority order. The sorting can be executed via the sorter engine of a pre-emptive real-time processor.

In step S540, it is determined whether the second subset can be scheduled using an exact condition test. The determining can be executed via circuitry of the pre-emptive real-time processor.

In step S545, one or more tasks of the second subset which cannot be scheduled using the inexact condition test or the exact condition test are filtered out.

In step S550, a second enhanced data packet having a second set of processing instructions is transferred from the sorter engine to the feasibility tester engine.

In step S555, remaining tasks of the second subset are tested according to the second set of processing instructions using the exact condition test. The testing can be executed via the feasibility tester engine of the pre-emptive real-time processor.

In step S560, the tested remaining tasks of the second subset are sorted into a fourth scheduling priority order. The sorting can be executed via the sorter engine of the pre-emptive real-time processor.

In step S565, the sorted and tested first subset is executed. The execution can be implemented via an execution engine of the pre-emptive real-time processor.

In step S570, the sorted and tested remaining tasks of the second subset are executed. The execution can be implemented via the execution engine of the pre-emptive real-time processor.

A number of implementations have been described. Nevertheless, it will be understood that various modifications may be made without departing from the spirit and scope of this disclosure. For example, preferable results may be achieved if the steps of the disclosed techniques are performed in a different sequence, if components in the disclosed systems are combined in a different manner, or if the components are replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Embodiments described herein can be implemented in conjunction with the devices described above. Embodiments described herein are a combination of hardware and software, and processing circuitry by which the software is implemented.

Embodiments described herein have several advantages over conventional systems and methods used in feasibility testing of real-time systems. In one example, a conventional system uses two processors. A first processor is used exclusively for running real-time tasks with a deadline guarantee and a second general purpose processor is used for running general tasks that are not schedulable on the exclusive processor. In contrast, embodiments described herein can use a single processor for running the entire task set.

In a second example, a conventional system exploits slack time. When a task completes before its deadline, the remaining slack time is divided among other tasks. As a result, the CPU runs at a lower speed for power savings. In contrast, embodiments described herein do not change the system speed. The task set is divided into two subsets according to RM scheduling to provide a faster feasibility analysis.

In a third example, a conventional system divides a task set into two subsets. However, the conventional system checks the feasibility in a highest priority first order, whereas embodiments described herein check the feasibility of the larger subset in a lowest priority first order.

In a fourth example, a conventional system adjusts the system speed on the fly to maximize the power consumption of the system. Heuristics are proposed based on portioning the system such that a task is assigned to multiple processors. In contrast, embodiments described herein uses a single processor system, wherein the partition or splitting of a task set is based on a mathematical formulation, rather than heuristics. In addition, the instant system does not change the system speed for energy consumption.

In a fifth example, a conventional system uses a concept of least common multiple to create the feasibility of a system. In contrast, embodiments described herein rely on task periods, wherein the motivation is to find a system feasibility problem early in the process.

In a sixth example, a conventional system allocates multiple frames generated by a task to a single processor. Multiple processors are used where the feasibility test drawn is based on a ratio of task computation time to task periods. The system is based on this ratio and will continue to be feasible for soft real-time tasks as long as the ratio is less than or equal to the number of processors. In contrast, embodiments described herein use hard real-time systems and a uniprocessor system that is capable of running all tasks and their associated jobs.

In summary, embodiments described herein check the feasibility of a larger subset in a lowest priority first order. RTA is used as an exact condition test. The feasibility order is reversed and therefore, a Hyperbolic Exact Test (HET) is not applicable.

A number of implementations have been described. Nevertheless, it will be understood that various modifications may be made without departing from the spirit and scope of this disclosure. For example, preferable results may be achieved if the steps of the disclosed techniques are performed in a different sequence, if components in the disclosed systems are combined in a different manner, or if the components are replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A real-time system for determining rate-monotonic scheduling feasibility of tasks of an asynchronous transfer mode communication network and executing feasible tasks, comprising:
   a pre-emptive real-time database; and
   a pre-emptive real-time processor having circuitry configured to:
      sort a set of tasks of the asynchronous transfer mode communication network into a first scheduling priority order in a descending order of priority based on activation rates of the tasks of the set of tasks;
      split the sorted set of tasks into a first subset which can be scheduled using an inexact condition test and a second subset which cannot be scheduled using the inexact condition test, wherein the inexact condition test is an LL-bound test:
      transfer a first enhanced data packet having a first set of processing instructions from a sorter engine to a feasibility tester engine;
      test the first subset according to the first set of processing instructions using the inexact condition test;
      sort the tested first subset into a second scheduling priority order in a descending order of priority based on activation rates of the tasks of the tested first subset:
      sort the second subset into a third scheduling priority order in an ascending order of priority based on activation rates of the tasks of the second subset;
      determine whether the second subset can be scheduled using an exact condition test if a calculated response-time for each task of the second subset is less than a corresponding deadline;
      filter out one or more tasks of the second subset which cannot be scheduled using the inexact condition test or the exact condition test;
      transfer a second enhanced data packet having a second set of processing instructions from the sorter engine to the feasibility tester engine;
      test remaining tasks of the second subset according to the second set of processing instructions using the exact condition test, wherein the exact condition test is a response time analysis (RTA) test;
      sort the tested remaining tasks of the second subset into a fourth scheduling priority order;
      execute the sorted and tested first subset:
      execute the sorted and tested remaining tasks of the second subset; and
      transfer and retrieve data to and from the pre-emptive real-time database.

2. The system of claim 1, wherein the system comprises a uniprocessor system.

3. The system of claim 1, configured to be executed with one of an operating system scheduler, cloud-based gaming, robotics, avionics, or vehicles.

4. The system of claim 1, wherein the pre-emptive real-time processor includes the sorter engine, a splitter engine, the feasibility tester engine, and an execution engine.

5. The system of claim 1, wherein the pre-emptive real-time database includes a plurality of priority lists, a plurality of divided test lists, and a plurality of test results.

* * * * *